United States Patent
Petrov

(10) Patent No.: US 9,910,282 B2
(45) Date of Patent: Mar. 6, 2018

(54) INCREASING FIELD OF VIEW OF HEAD-MOUNTED DISPLAY USING A MIRROR

(71) Applicant: Oculus VR, LLC, Menlo Park, CA (US)

(72) Inventor: Yury Anatolievich Petrov, Coto de Caza, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 14/980,817

(22) Filed: Dec. 28, 2015

(65) Prior Publication Data

US 2017/0186231 A1    Jun. 29, 2017

(51) Int. Cl.
   *G02B 27/01*     (2006.01)
   *G06F 3/01*      (2006.01)

(52) U.S. Cl.
   CPC .......... *G02B 27/0172* (2013.01); *G06F 3/011* (2013.01); *G02B 2027/0123* (2013.01)

(58) Field of Classification Search
   None
   See application file for complete search history.

(56) References Cited

U.S. PATENT DOCUMENTS

| | | | | |
|---|---|---|---|---|
| 5,825,539 A * | 10/1998 | Hoshi | ................. | G02B 27/017 345/9 |
| 2010/0110069 A1* | 5/2010 | Yuan | ...................... | G06T 15/20 345/419 |
| 2010/0182219 A1* | 7/2010 | Tomisawa | .......... | G02B 27/2292 345/4 |
| 2016/0018645 A1* | 1/2016 | Haddick | ................. | G06T 19/20 345/8 |
| 2016/0091720 A1* | 3/2016 | Stafford | ............. | G02B 27/0172 345/8 |

* cited by examiner

*Primary Examiner* — Kee M Tung
*Assistant Examiner* — Yanna Wu
(74) *Attorney, Agent, or Firm* — Fenwick & West LLP

(57) ABSTRACT

A head-mounted display (HMD) (e.g., VR headset or AR headset) displays a 3D virtual scene and includes a mirror to increase a field of view (FOV). The HMD includes an electronic display that further includes a primary display and an extended display, where the content displayed on the primary display is presented to the user's eye at an exit pupil through a lens and content displayed on the extended display is presented at the exit pupil through reflections of the mirror. The mirror is positioned between the exit pupil and the electronic display such that the mirror reflects light originating from the extended display and provides the reflected light to the exit pupil to increase the FOV. The combination of the content viewed through the lens and that of the reflected light of the extended display results in an FOV larger than when the content is viewed only through the lens.

20 Claims, 3 Drawing Sheets

INCREASING FIELD OF VIEW OF HEAD-MOUNTED DISPLAY USING A MIRROR

BACKGROUND

The present disclosure generally relates to head-mounted displays (HMDs), and specifically to increasing a field of view (FOV) of a HMD using a mirror.

HMDs may be used to present augmented and/or virtual information to a user. For example, a virtual reality (VR) headset can be used to simulate virtual environments. Conventional lenses used in HMDs have an FOV that is lower than a theoretical FOV limit of a human eye, which can approach 200 degrees per eye. For example, a state-of-the art conventional lens has an FOV of about 110 degrees. The FOV of a lens can be increased by increasing its diameter. To increase the FOV of conventional lenses to more than 110 degrees, the diameter (and weight) required for such lenses is large enough to make such lenses impractical for applications using HMDs such as a VR headset or an augmented reality (AR) headset.

SUMMARY

A HMD such as a VR headset or an AR headset displays a three-dimensional (3D) virtual scene and includes a mirror to increase a FOV of the HMD. The HMD includes an electronic display for each eye that further includes a primary display and an extended display, where the content displayed on the primary display is presented at an exit pupil that corresponds to a position of a user's eye through a lens and content displayed on the extended display is presented at the exit pupil through reflections of the mirror (and is not visible through the lens). The content displayed on the primary display and the extended display corresponds to different portions of the same image. In some embodiments, the primary display and the extended display are separate physical display elements. Alternatively, the primary display and the extended display belong to the same physical display panel but are logically separated. The exit pupil represents a location where the eye is positioned at the HMD. The mirror is positioned between the exit pupil and the electronic display such that the mirror reflects light originating from the extended display and provides the reflected light to the exit pupil to increase the FOV. The combination of the content viewed through the lens and that of the reflected light of the extended display produces an FOV larger than an FOV corresponding to only the content viewed through the lens.

The mirror may be an aspherical mirror with two openings, the first opening enables the eye to be positioned at the exit pupil of the HMD and the second opening enables light originating from the extended display to be reflected at the mirror and to be presented at the exit pupil. For example, the aspherical mirror is a parabolic mirror. The extended display includes one or more elements that circumscribe the periphery of the primary display. The resolution of the extended display may be of a lower resolution relative to that of the primary display to match the user's peripheral vision. The content displayed on the extended display has an orientation that is reversed in both X and Y directions (i.e., reversed in the horizontal axis and upside down in the vertical axis) relative to the orientation of the content displayed on the primary display.

The content displayed on the extended display is pre-distorted to correct for optical errors such as pincushion distortion that the content undergoes when the content is reversed in both X and Y directions. In some embodiments, the content displayed on the primary display is also pre-distorted to correct for optical errors. The pre-distortion applied to the content of the extended display may be different from that of the primary display as the applied pre-distortions correct different optical errors.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
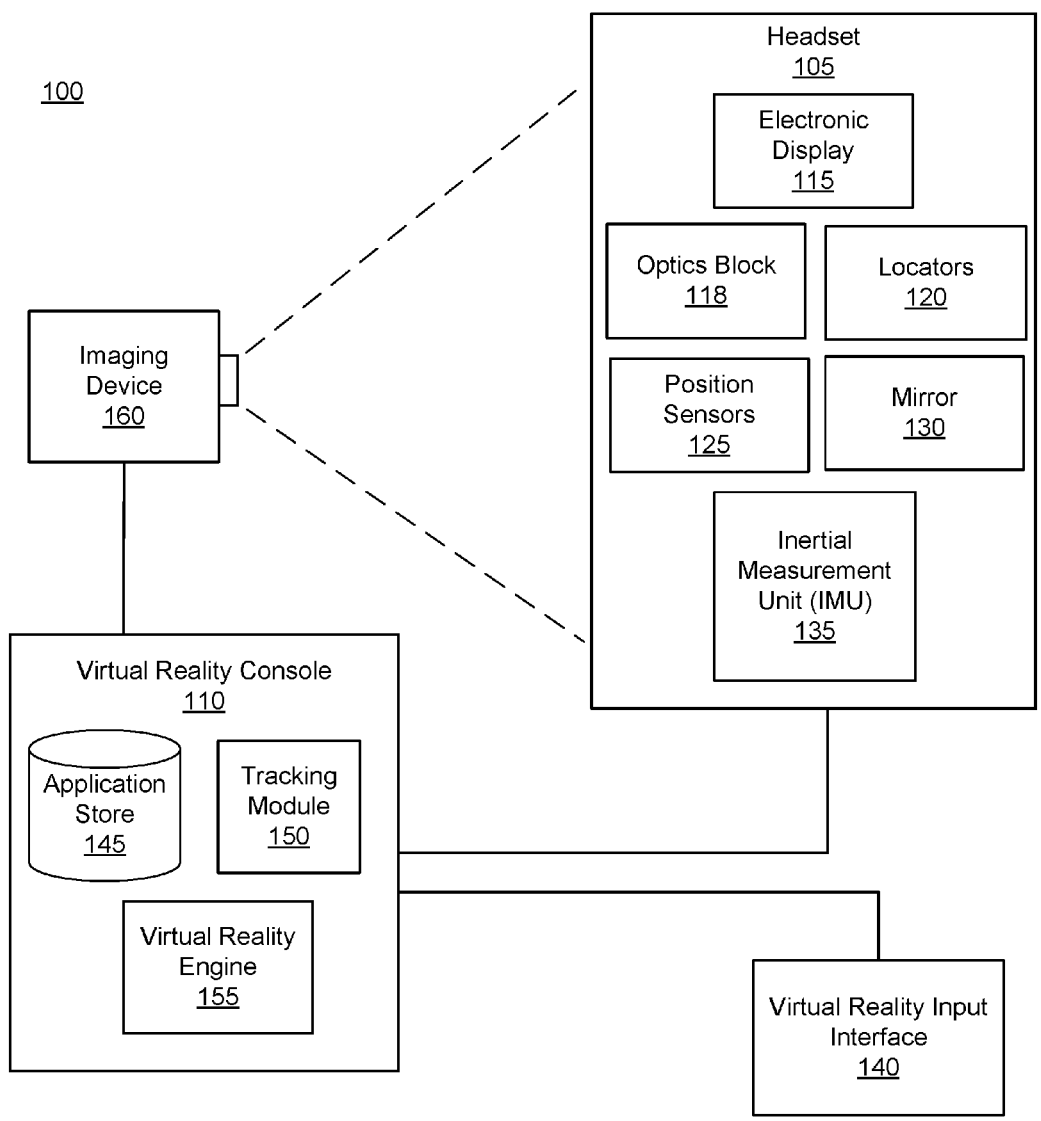
FIG. 1 is a block diagram of a system environment including a VR system, in accordance with an embodiment.

FIG. 1 is a VR system environment 100 in which a VR console 110 operates. In this example, the VR system environment 100 includes a HMD 105, an imaging device 160, and a VR input interface 140, which are each coupled to the VR console 110. While FIG. 1 shows a single HMD 105, a single imaging device 160, and a single VR input interface 140, in other embodiments, any number of these components may be included in the system. For example, there may be multiple HMDs 105 each having an associated VR input interface 140 and being monitored by one or more imaging devices 160, with each HMD 105, VR input interface 140, and imaging devices 160 communicating with the VR console 110. In alternative configurations, different and/or additional components may also be included in the VR system environment 100. While system environment 100 of FIG. 1 is described in a VR context, the system environment 100 of FIG. 1 may also be part of other HMD systems such as, for example, an AR system environment.

The HMD 105 is a HMD that presents content to a user. Example content includes images, video, audio, or some combination thereof. Audio content may be presented via a separate device (e.g., speakers and/or headphones) external to the HMD 105 that receives audio information from the HMD 105, the VR console 110, or both. The HMD 105 includes an electronic display 115, an optics block 118, one or more locators 120, position sensors 125, a mirror 130, and an internal measurement unit (IMU) 135.

While the HMD 105 is described in FIG. 1 in a VR context as part of a VR system environment, the HMD 105 may also be part of other HMD systems such as, for example, an AR headset in an AR system environment. In embodiments that describe AR system environment, the HMD 105 augments views of a physical, real-world environment with computer-generated elements (e.g., images, video, sound, etc.). The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. An embodiment of the HMD 105 is further described below in conjunction with FIGS. 2 and 3.

The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMO-LED), some other display, or some combination thereof.

The electronic display 115 corresponding to each eye has two elements, a primary display element and an extended display element, to increase a FOV of the HMD 105. The user views content displayed on the primary display element through the optics block 118 and the content displayed on the extended display element through the mirror 130. The extended display element is a display element that circumscribes the periphery of the primary display element and the content displayed on the extended display element is within the user's peripheral vision. The resolution of the extended display element may be lower than that of the primary display element to match the user's peripheral vision and to optimize system resources.

The optics block 118 directs light from the primary display element of the electronic display 115 to the exit pupil for viewing by a user using one or more optical elements, such as apertures, Fresnel lenses, convex lenses, concave lenses, filters, and so forth, and may include combinations of different optical elements. The optics block 118 magnifies received light from the primary display element, corrects optical errors associated with the image light, and the corrected image light is presented to a user of the HMD 105. In some embodiments, one or more of the optical elements in the optics block 118 may have one or more coatings, such as anti-reflective coatings.

Magnification of the image light by the optics block 118 allows the electronic display 115 (e.g., primary display element portion of the electronic display 115) to be physically smaller, weigh less, and consume less power than larger displays. Additionally, magnification may increase an FOV of the displayed content. For example, the FOV of the displayed content is such that the displayed content is presented using almost all (e.g., 110 degrees diagonal), and in some cases all, of the user's field of view. While the FOV of the displayed content may be increased by changing the diameter of the optics block 118, an FOV larger than about 110 degrees is difficult due to the required diameter and weight of the optics block 118 in HMD applications. An example method of increasing the FOV is discussed below in conjunction with FIG. 3.

The optics block 118 may be designed to correct one or more types of optical errors in addition to fixed pattern noise (i.e., the screen door effect) for the content being displayed on the primary display element. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the primary display element portion of the electronic display 115.

The mirror 130 reflects light originating from the extended display element and presents it to the exit pupil. The mirror 130 is typically an aspherical mirror with two openings, a smaller opening near the exit pupil and a larger opening closer to the display. The mirror 130 may not be rotationally symmetric. For example, the mirror 130 is a parabolic reflector that is rotationally asymmetric. The mirror 130 may be a converging mirror (e.g., concave mirror) with its reflecting surface bulging inward and away from the light incident from the extended display element. Concave mirrors are used for focusing light by reflecting the incident light inward to one focal point.

The mirror 130 may be manufactured using materials such as plastic or glass. The mirror 130 may include an optical coating such as a metal coating (e.g., aluminum, silver, gold, etc.), dielectric coating (e.g., magnesium fluoride, calcium fluoride, and various metal oxides), or some combination thereof. In some embodiments, two or more mirrors 130 may be used to reflect light originating from the extended display element onto one exit pupil 340. For example, it may be easier to manufacture two separate mirrors 130 and then combine them to function as a reflector of light originating from the extended display element onto one exit pupil 340.

The mirror 130 is positioned between the exit pupil and a two-dimensional plane corresponding to the extended display element such that light originating from the extended display element is reflected by the mirror 130 and presented to the exit pupil. The dimensions and the placement of the mirror 130 are chosen relative to that of the optics block 118 such that light corresponding to the content not visible through the optics block 118 is reflected at the mirror 130 and presented at the exit pupil. In one embodiment, the mirror 130 is an aspherical mirror with two openings, a smaller opening near the exit pupil and a larger opening closer to the extended display element. Alternatively, other types of mirrors may be used to reflect light corresponding to content not visible through the optics block 118. In one embodiment, the mirror 130 is positioned within the HMD such that light originating from the extended display element does not pass through the optics block (i.e., not visible to the user's eye in the first view of the content). The mirror 130 may be a simple low-cost mirror similar to a collimating mirror used in a flashlight.

The mirror 130 is a curved aspherical mirror such that when the user views the content displayed on the extended display after being reflected by the mirror 130, the orientation of the content seen by the user is reversed in both X and Y directions (i.e., reversed in the horizontal axis and upside down in the vertical axis) relative to the orientation of the content being displayed on the extended display element. To correct for this change in orientation, the content displayed on the extended display has an orientation that is reversed in both X and Y directions (i.e., reversed in the horizontal axis and upside down in the vertical axis) relative to the orientation of the content displayed on the primary display element such that user views the content displayed on both the primary and the extended display elements in the same orientation.

Content displayed on the primary display element typically has a FOV limit of around 110 degrees (when viewed through the optics block 118), whereas human vision has a theoretical FOV limit that is greater than 180 degrees and can approach 200 degrees per eye. Content corresponding to a FOV larger than 110 degrees can be rendered on extended display element, which can then be viewed by the eye using the mirror 130.

The locators 120 are objects located in specific positions on the HMD 105 relative to one another and relative to a specific reference point on the HMD 105. A locator 120 may be a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 135 is an electronic device that generates fast calibration data based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 135, or some combination thereof. The position sensors 125 may be located external to the IMU 135, internal to the IMU 135, or some combination thereof.

Based on the one or more measurement signals from one or more position sensors 125, the IMU 135 generates fast calibration data indicating an estimated position of the HMD 105 relative to an initial position of the HMD 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 135 rapidly samples the measurement signals and calculates the estimated position of the HMD 105 from the sampled data. For example, the IMU 135 integrates the measurement signals received from the accelerometers over time to estimate a velocity vector and integrates the velocity vector over time to determine an estimated position of a reference point on the HMD 105. Alternatively, the IMU 135 provides the sampled measurement signals to the VR console 110, which determines the fast calibration data. The reference point is a point that may be used to describe the position of the HMD 105. While the reference point may generally be defined as a point in space; however, in practice the reference point is defined as a point within the HMD 105 (e.g., a center of the IMU 135).

The IMU 135 receives one or more calibration parameters from the VR console 110. As further discussed below, the one or more calibration parameters are used to maintain tracking of the HMD 105. Based on a received one or more calibration parameters, the IMU 135 may adjust one or more IMU parameters (e.g., sample rate). In some embodiments, certain calibration parameters cause the IMU 135 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 160 generates slow calibration data in accordance with calibration parameters received from the VR console 110. Slow calibration data includes one or more images showing observed positions of the locators 120 that are detectable by the imaging device 160. The imaging device 160 may include one or more cameras, one or more video cameras, any other device capable of capturing images including one or more of the locators 120, or some combination thereof. Additionally, the imaging device 160 may include one or more filters (e.g., used to increase signal to noise ratio). The imaging device 160 is configured to detect light emitted or reflected from locators 120 in a field of view of the imaging device 160. In embodiments where the locators 120 include passive elements (e.g., a retroreflector), the imaging device 160 may include a light source that illuminates some or all of the locators 120, which retro-reflect the light towards the light source in the imaging device 160. Slow calibration data is communicated from the imaging device 160 to the VR console 110, and the imaging device 160 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides content to the HMD 105 for presentation to the user in accordance with information received from one or more of: the imaging device 160, the HMD 105, and the VR input interface 140. In the example shown in FIG. 1, the VR console 110 includes an application store 145, a tracking module 150, and a VR engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HMD 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the HMD 105. For example, the tracking module 150 adjusts the focus of the imaging device 160 to obtain a more accurate position for observed locators on the HMD 105. Moreover, calibration performed by the tracking module 150 also accounts for information received from the IMU 135. Additionally, if tracking of the HMD 105 is lost (e.g., the imaging device 160 loses line of sight of at least a threshold number of the locators 120), the tracking module 140 re-calibrates some or all of the system environment 100.

The tracking module 150 tracks movements of the HMD 105 using slow calibration information from the imaging device 160. The tracking module 150 determines positions of a reference point of the HMD 105 using observed locators from the slow calibration information and a model of the HMD 105. The tracking module 150 also determines positions of a reference point of the HMD 105 using position information from the fast calibration information. Additionally, in some embodiments, the tracking module 150 may use portions of the fast calibration information, the slow calibration information, or some combination thereof, to predict a future location of the HMD 105. The tracking module 150 provides the estimated or predicted future position of the HMD 105 to the VR engine 155.

The VR engine 155 executes applications within the system environment 100 and receives position information, acceleration information, velocity information, predicted future positions, or some combination thereof of the HMD 105 from the tracking module 150. Based on the received information, the VR engine 155 determines content to provide to the HMD 105 for presentation to the user. For example, if the received information indicates that the user has looked to the left, the VR engine 155 generates content for the HMD 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the HMD 105 or haptic feedback via the VR input interface 140.

Figure 2:
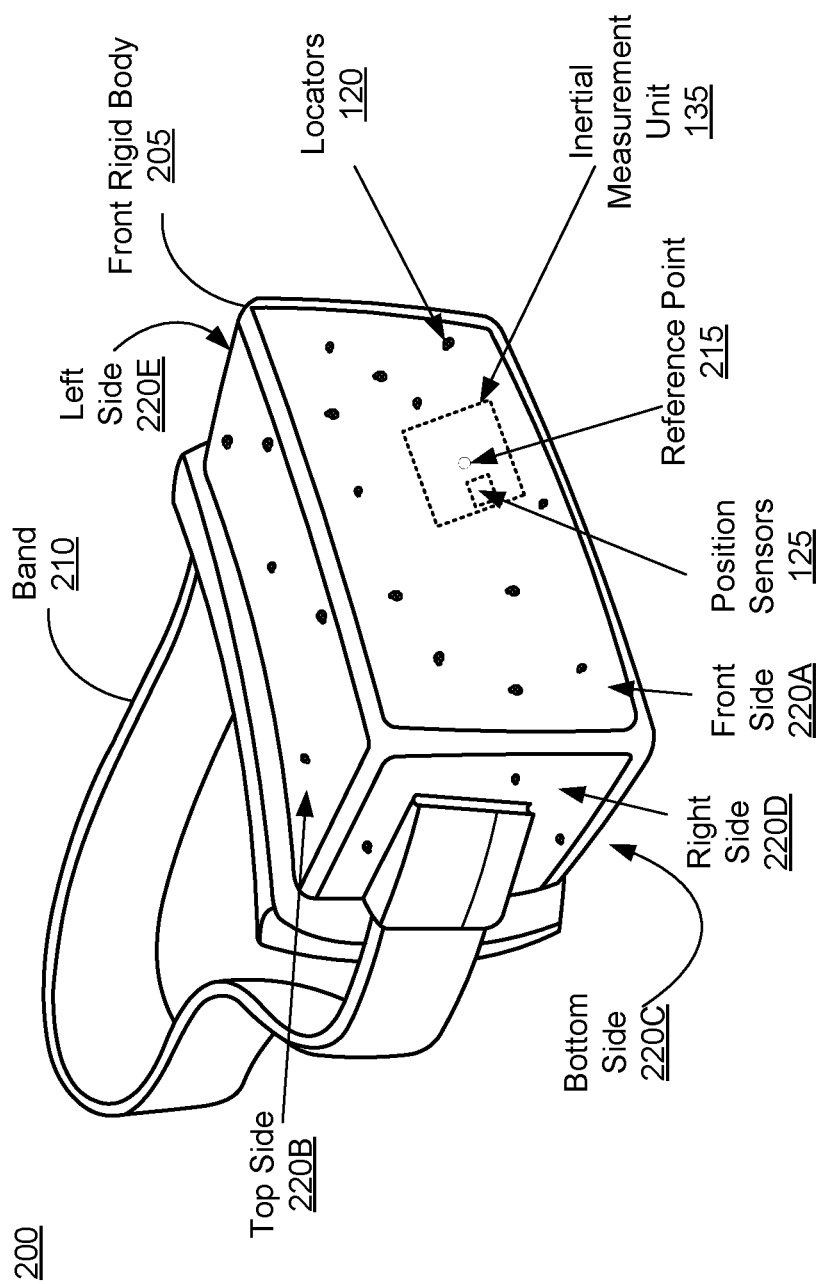
FIG. 2 is a diagram of a VR headset, in accordance with an embodiment.

FIG. 2 is a diagram of a VR headset, in accordance with an embodiment. The VR headset 200 is an embodiment of the HMD 105, and includes a front rigid body 205 and a band 210. The front rigid body 205 includes the electronic display 115 (not shown in FIG. 2), the IMU 135, the one or more position sensors 125, and the locators 120. In the embodiment shown by FIG. 2, the position sensors 125 are located within the IMU 135, and neither the IMU 135 nor the position sensors 125 are visible to the user.

The locators 120 are located in fixed positions on the front rigid body 205 relative to one another and relative to a reference point 215. In the example of FIG. 2, the reference point 215 is located at the center of the IMU 135. Each of the locators 120 emit light that is detectable by the imaging device 160. Locators 120, or portions of locators 120, are located on a front side 220A, a top side 220B, a bottom side 220C, a right side 220D, and a left side 220E of the front rigid body 205 in the example of FIG. 2.

As discussed above in conjunction with FIG. 1, the optics block of the HMD (e.g., optics block 118) magnifies the image light presented at an exit pupil of the HMD. While the FOV of the displayed content may be increased by changing the diameter of the optics block 118, an FOV larger than about 110 degrees is difficult due to the required diameter and weight of the optics block 118 in HMD applications. One example technique for increasing the FOV of content displayed on the HMD is to extend the electronic display by adding an extended display and a mirror that reflects light originating from the extended display to present the reflected light at the exit pupil. Such example technique is described below in conjunction with FIG. 3.

Increasing FOV Using Extended Display and Mirror

Figure 3:
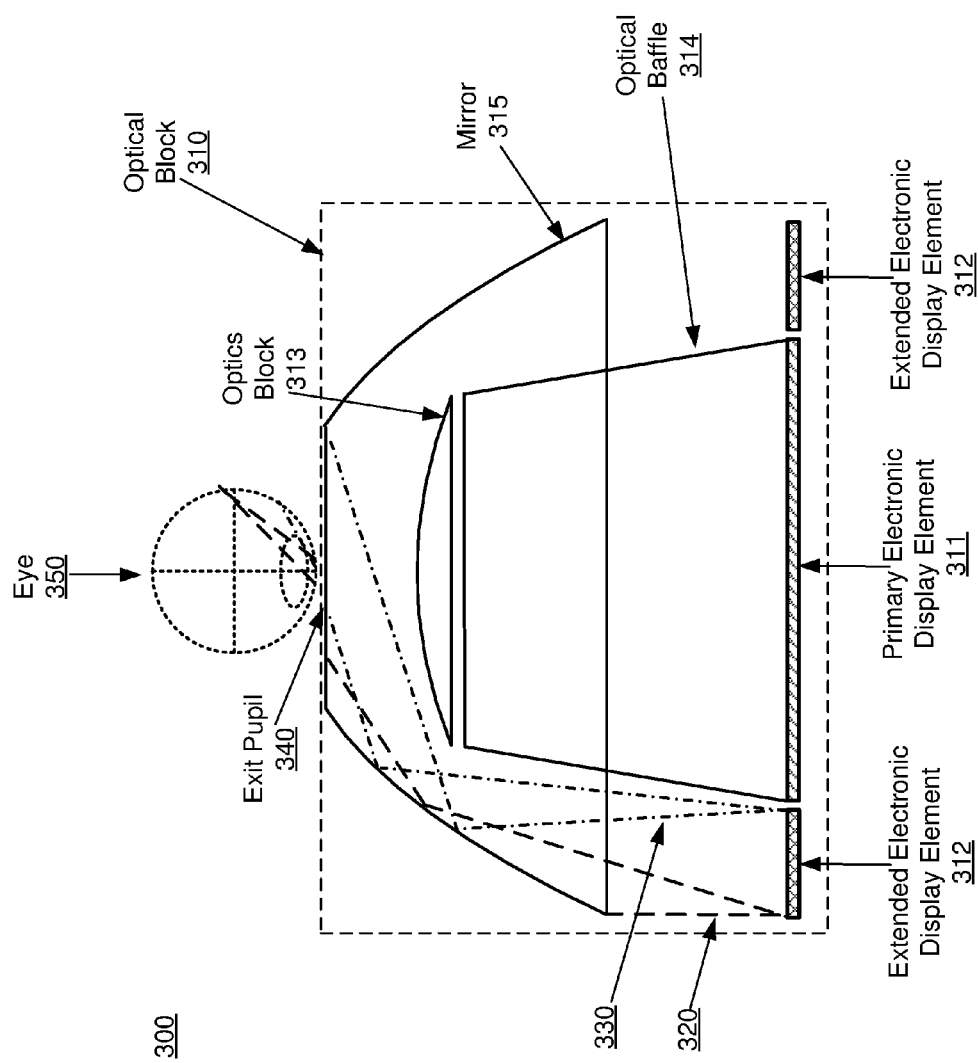
FIG. 3 is a cross section of a portion of a HMD showing an example arrangement of a HMD lens, an electronic display, and a mirror for increasing field of view of the HMD, in accordance with an embodiment.

FIG. 3 depicts a cross section 300 of a HMD e.g., HMD 105 or a HMD in some other system (e.g., an AR system), showing an example arrangement of a HMD lens, an electronic display, and a mirror for increasing an FOV of the HMD, in accordance with an embodiment. As shown in FIG. 3, the cross section 300 shows an optical block 310 that includes an electronic display, an optical baffle 314, an optics block 313, a mirror 315. The cross section 300 also shows an eye 350 of a user and an exit pupil 340 that represents a location of the HMD where the eye 350 is positioned. FIG. 3 also shows how light displayed on a portion of the electronic display is reflected off of the mirror 315 and reaches the exit pupil 340. For purposes of illustration, FIG. 3 shows a cross section 300 associated with a single eye 345, but another optical block, separate from the optical block 310, provides altered image light to another eye of the user.

The electronic display includes a primary electronic display element 311 and an extended electronic display element 312. The HMD displays content to the user using both the primary electronic display element 311 and the extended electronic display element 312. The content displayed on the primary electronic display element 311 reaches the exit pupil 340 through the optics block 313. The content displayed on the extended electronic display element 312 reaches the exit pupil 340 through the mirror 315. In some embodiments, the primary electronic display element 311 and the extended electronic display element 312 are separate physical display elements. Alternatively, the primary electronic display element 311 and the extended electronic display element 312 belong to the same physical display panel but are logically separated.

The primary electronic display element 311 emits image light toward the optics block 313 through an optical baffle 314, where the optical baffle 314 prevents light pollution between the light emitted from the primary electronic display element 311 and that of the extended electronic display element 312. Said differently, the content displayed on the extended electronic display element 312 is not visible at the exit pupil 340 through the optics block 313. The optics block 313 magnifies the image light, and in some embodiments, also corrects for one or more additional optical errors (e.g., distortion, astigmatism, etc.). The optics block 313 directs the image light to the exit pupil 340 for presentation to the user.

The content displayed on the electronic display may be divided into two portions, a central portion (e.g., a first view) for display on the primary electronic display element 311 and an outer portion (e.g., second view) for display on the extended electronic display element 312 that does not include the central portion. The central portion may have an FOV of up to about 110 degrees, and the outer portion of the content includes the portion of the content that corresponds to a FOV of greater than 110 degrees. When the user views a combination of both the central portion and the outer portion of the content, the combined FOV of the content is greater than 110 degrees and may be only limited by the maximum FOV of the outer portion of content. For example, the outer portion may include content that corresponds to FOV up to about 170 degrees per eye.

The primary electronic display element 311 is configured to display the central portion of the content to an eye of a user of the HMD, where the central portion provides a first FOV for the user's eye. In one embodiment, the primary electronic display element 311 is a rectangular-shaped display. Alternatively, the primary electronic display element 311 may include other shapes such as a circular display, an oval display, or other multiple edge-shaped display.

The extended electronic display element 312 is configured to display the outer portion of content, where the outer portion provides a second FOV for the user's eye. The extended electronic display element 312 circumscribes the periphery of the primary electronic display element 311 in order to be able to display the outer portion of the content. In one embodiment, the extended electronic display element 312 is a single element that circumscribes the periphery of the primary electronic display element 311. For an example rectangular primary electronic display element 311, the extended electronic display element 312 is a single element that circumscribes all four edges of the rectangular-shaped primary display element. Alternatively, the extended electronic display element 312 may include multiple elements that circumscribe the extended electronic display element 312 as a group.

The orientation of the outer portion of the content displayed on the extended electronic display element 312 is different from an orientation of the central portion displayed on primary electronic display element 311. For example, the orientation of the outer portion is reversed in both X and Y directions (i.e., reversed in the horizontal axis and upside down in the vertical axis) relative to that of the orientation of the central portion. When a curved mirror such as the mirror 315 is used, the outer portion of the content is presented at the exit pupil 340 after being reflected at the mirror 315, and is reversed in both X and Y directions relative to the orientation of the content displayed on the extended electronic display element 312. To compensate for this change in orientation, the orientation of the outer portion being displayed on the extended electronic display element 312 is reversed in both X and Y directions relative to that of the central portion displayed on the primary electronic display element 311.

In one embodiment, the extended electronic display element 312 is positioned in a same two-dimensional plane as that of the primary electronic display element 311. In one embodiment, the extended electronic display element 312 has a lower resolution relative to that of the primary electronic display element 311. For example, the user's peripheral vision for content displayed off-axis is less clear relative to the user's foveal vision for content displayed on axis. Accordingly, it is sufficient to provide content in user's peripheral vision (e.g., displayed on the extended electronic display element 312) at a lower resolution relative to that of the content in the user's foveal vision (e.g., displayed on the primary electronic display element 311). Such lowering of the resolution of the content displayed on the extended electronic display element 312 improves the efficiency of the system resources and enables to use a cheaper display for the extended electronic display element 312.

The dimensions of the primary electronic display element 311, the extended electronic display element 312, and that of the optics block 313 are chosen to have a large FOV for the displayed content. The dimensions of the extended electronic display element 312 are typically smaller than that of the primary electronic display element 311. For example, the length of the extended electronic display element 312 in the cross section 300 is about 15 mm on each the left and right sides of the primary electronic display element 311, and the corresponding length of the primary electronic display element 311 is much larger than 15 mm (e.g., 60 mm).

The outer portion (i.e., second view) of the content is depicted in FIG. 3 with example light rays 320 and 330 that originate at the extended electronic display element 312, reflect at a surface of the mirror 315 and reach exit pupil 340 for the user's eye to view it. The orientation of the content viewed by the user's eye after being reflected at the mirror 313 is reversed in both X and Y directions (i.e., reversed in the horizontal axis and upside down in the vertical axis) relative to the orientation of the content displayed on the extended electronic display element 312. To correct for this, the orientation of the content being displayed on the extended electronic display element 312 has a different orientation from that of the content being displayed on the primary electronic display element 311. For example, the orientation of the content displayed on the extended electronic display element 312 is reversed in both X and Y directions (i.e., reversed in the horizontal axis and upside down in the vertical axis) relative to that of the orientation of the content being displayed on the primary electronic display element 311.

The second view of the content is visible to the user's eye at the exit pupil 340 when the user looks through the opening in the mirror 315 and the content corresponding to the second view appears far in the visual periphery due to the angles of reflection. For example, the light rays 320 and 330 show how light originating from the extremities of the extended electronic display element 312 (e.g., left portion of the extended display element 312 of the cross section 300) are reflected at the mirror 315 and presented at the exit pupil 340. Due to the mirror image orientation of the content of the second view (relative to the orientation of that of the first view), rays 320 correspond to the portion of the content that is adjacent to the content when the FOV of the optics block 313 ends (i.e., corresponding to primary electronic display element 311). The rays 330 correspond to the portion of the content that corresponds to the highest FOV. For example, rays 320 correspond to content at about 55 degrees periphery and rays 330 correspond to content at about 80 degrees or higher (e.g., up to 85 degrees) periphery on the left portion of the extended electronic display element 312. Similar to light rays 320 and 330, light rays corresponding to the right portion of the extended electronic display element 312 of the cross section 300 (not shown in FIG. 3 for simplicity) are reflected at the mirror 315 and presented at the exit pupil 340. The combination of the light rays corresponding to the left and right portions of the extended electronic display element 312, when combined with the first view of content displayed on the primary electronic display element 311 (and viewed thorough the optics block 313) increases the FOV of the HMD from about 110 degrees to greater than 160 degrees per eye. In some embodiments, the overall FOV may be up to 170 degrees per each eye.

In one embodiment, the content rendered for display on the electronic display is pre-distorted to correct for one or more optical errors. For example, the one or more optical errors including at least one of: barrel distortion, pincushion distortion, longitudinal chromatic aberration, transverse chromatic aberration, spherical aberration, comatic aberration, field curvature, and astigmatism. In one embodiment, the pre-distortion of the content rendered on the extended electronic display element 312 is a different pre-distortion compared with the pre-distortion of the content rendered on the primary electronic display element 311. For example, the content rendered on the extended electronic display element 312 is pre-distorted to correct for pincushion distortion and the content rendered on the primary electronic display element 311 is pre-distorted to correct for a distortion other than (or in addition to) pincushion distortion.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head-mounted display (HMD) comprising:
a primary electronic display configured to display a first view of content;
an optics block configured to direct light originating from the primary electronic display to an exit pupil of the HMD corresponding to a location of an eye of a user of the HMD, the directed light corresponding to first field of view (FOV);
an extended electronic display that circumscribes the primary electronic display in a same two-dimensional (2D) plane as the primary electronic display, the extended electronic display configured to display a second view of the content; and
a mirror positioned between the exit pupil and the 2D plane of the extended electronic display, the mirror configured to reflect light directly received from the extended electronic display and to provide the reflected light to the exit pupil, wherein a combination of the first view and the second view of the content produces a FOV larger than the first FOV and the mirror is configured to not directly receive light from the primary electronic display, wherein the mirror is separate from the optics block, and wherein the mirror is an aspherical mirror with two openings, a smaller one of the two openings being closer to the exit pupil of the HMD than a larger one of the two openings, and the larger one of the two openings being closer to the primary electronic display and the extended display than the smaller one of the two openings.

2. The HMD of claim 1, wherein the extended electronic display is configured to display content in the second view in an orientation different from an orientation of content displayed in the first view.

3. The HMD of claim 2, wherein the orientation of content displayed in the second view is reversed and upside down relative to the orientation of content displayed in the first view.

4. The HMD of claim 1, wherein the extended electronic display includes a single element circumscribing all outer edges of the primary electronic display.

5. The HMD of claim 1 further comprising:
an optical baffle configured to direct light originating from the primary electronic display to the optics block and to prevent light originating from the extended electronic display from reaching the optics block.

6. The HMD of claim 1, wherein the content rendered on at least one of the primary electronic display and the extended electronic display is pre-distorted to correct for one or more optical errors, the one or more optical errors including at least one of: barrel distortion, pincushion distortion, longitudinal chromatic aberration, transverse chromatic aberration, spherical aberration, comatic aberration, field curvature, and astigmatism.

7. The HMD of claim 6, wherein the pre-distortion of the content rendered on the extended electronic display is a different pre-distortion compared with the pre-distortion of the content rendered on the primary electronic display.

8. The HMD of claim 1, wherein the mirror is a curved aspherical mirror positioned to reflect light directly received from the extended display towards the exit pupil.

9. The HMD of claim 1, wherein the extended electronic display has a lower resolution relative to a resolution of the primary electronic display.

10. The HMD of claim 1, wherein the first FOV is up to 110 degrees and the FOV of the combination of the first view and the second view of the content is up to 170 degrees per eye.

11. The HMD of claim 1, wherein the extended electronic display has a lower resolution relative to a resolution of the primary electronic display.

12. A head-mounted display (HMD) comprising:
a primary electronic display configured to display a first view of content to an eye of a user of the HMD, the first view corresponding to a first field of view (FOV);
an extended electronic display that circumscribes the primary electronic display in a same two-dimensional (2D) plane as the primary electronic display, the extended electronic display configured to display a second view of the content; and
a mirror positioned between an exit pupil of the HMD corresponding to a location of the eye of the user of the HMD and the 2D plane of the extended electronic display, the mirror configured to reflect light directly received from the extended electronic display and to provide the reflected light to the exit pupil, wherein a combination of the first view and the second view of the content produces a FOV larger than the first FOV and the mirror is configured to not directly receive light from the primary electronic display, and wherein the mirror is an aspherical mirror with two openings, a smaller one of the two openings being closer to the exit pupil of the HMD than a larger one of the two openings, and the larger one of the two openings being closer to the primary electronic display and the extended display than the smaller one of the two openings.

13. The HMD of claim 12 further comprising:
an optics block configured to direct light originating from the primary electronic display to the exit pupil of the HMD corresponding to the location of the eye, the directed light corresponding to the first FOV, wherein the mirror is separate from the optics block.

14. The HMD of claim 13 further comprising:
an optical baffle configured to direct light originating from the primary electronic display to the optics block and to prevent light originating from the extended electronic display from reaching the optics block.

15. The HMD of claim 12, wherein the extended electronic display is configured to display content in the second view in an orientation different from an orientation of content displayed in the first view.

16. The HMD of claim 15, wherein the orientation of content displayed in the second view is reversed and upside down relative to the orientation of content displayed in the first view.

17. The HMD of claim 12, wherein the extended electronic display includes a single element circumscribing all outer edges of the primary electronic display.

18. The HMD of claim 12, wherein the content rendered on at least one of the primary electronic display and the extended electronic display is pre-distorted to correct for one or more optical errors, the one or more optical errors including at least one of: barrel distortion, pincushion distortion, longitudinal chromatic aberration, transverse chromatic aberration, spherical aberration, comatic aberration, field curvature, and astigmatism, the pre-distortion of the content rendered on the extended electronic display is a different pre-distortion compared with the pre-distortion of the content rendered on the primary electronic display.

19. The HMD of claim 12, wherein the mirror is a curved aspherical mirror positioned to reflect light directly received from the extended display towards the exit pupil.

20. A head-mounted display (HMD) comprising:
a primary electronic display configured to display a first view of content to an eye of a user of the HMD, the first view corresponding to a first field of view (FOV);
an extended electronic display that circumscribes the primary electronic display, the extended electronic display configured to display a second view of the content; and
a mirror positioned between an exit pupil of the HMD corresponding to a location of the eye of the user of the HMD and a two-dimensional (2D) plane of the extended electronic display, the mirror configured to reflect light directly received from the extended electronic display and to provide the reflected light to the exit pupil, wherein a combination of the first view and the second view of the content produces a FOV larger than the first FOV and the mirror is configured to not directly receive light from the primary electronic display, and wherein the mirror is an aspherical mirror with two openings, a smaller one of the two openings being closer to the exit pupil of the HMD than a larger one of the two openings, and the larger one of the two openings being closer to the primary electronic display and the extended display than the smaller one of the two openings.

\* \* \* \* \*

UNITED STATES PATENT AND TRADEMARK OFFICE
CERTIFICATE OF CORRECTION

PATENT NO. : 9,910,282 B2
APPLICATION NO. : 14/980817
DATED : March 6, 2018
INVENTOR(S) : Yury Anatolievich Petrov It is certified that error appears in the above-identified patent and that said Letters Patent is hereby corrected as shown below:

In the Claims

Column 11, Line 41, after "corresponding to" insert -- a --.

Signed and Sealed this
Ninth Day of October, 2018

Andrei Iancu
*Director of the United States Patent and Trademark Office*